United States Patent
Asaura et al.

(10) Patent No.: US 8,256,211 B2
(45) Date of Patent: Sep. 4, 2012

(54) AQUEOUS UREA SOLUTION FEED DEVICE OF AN INTERNAL COMBUSTION ENGINE

(75) Inventors: Shinya Asaura, Mishima (JP); Tomihisa Oda, Numazu (JP); Shunsuke Toshioka, Susono (JP); Yutaka Tanai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 495 days.

(21) Appl. No.: 12/598,204

(22) PCT Filed: Feb. 6, 2009

(86) PCT No.: PCT/JP2009/052443
§ 371 (c)(1),
(2), (4) Date: Oct. 30, 2009

(87) PCT Pub. No.: WO2009/102041
PCT Pub. Date: Aug. 20, 2009

(65) Prior Publication Data
US 2010/0115928 A1    May 13, 2010

(30) Foreign Application Priority Data
Feb. 14, 2008   (JP) ................................. 2008-033642

(51) Int. Cl.
*F01N 3/00*  (2006.01)
*F01N 3/10*  (2006.01)
(52) U.S. Cl. ............................... 60/295; 60/286; 60/301
(58) Field of Classification Search ............... 60/286, 60/287, 295, 301, 303
See application file for complete search history.

(56) References Cited

U.S. PATENT DOCUMENTS

| 6,063,350 A | 5/2000 | Tarabulski et al. |
| 6,637,196 B1 * | 10/2003 | Tost ................................ 60/286 |
| 2002/0162457 A1 | 11/2002 | Hyodo et al. |
| 2007/0180816 A1 | 8/2007 | Masuda et al. |
| 2007/0283685 A1 | 12/2007 | Ripper et al. |
| 2008/0223021 A1 * | 9/2008 | Shaikh et al. .................... 60/287 |

FOREIGN PATENT DOCUMENTS

| JP | 2002 527660 | 8/2002 |
| JP | 2003 42014 | 2/2003 |
| JP | 2003 314252 | 11/2003 |
| JP | 2004 293494 | 10/2004 |
| JP | 2005 105914 | 4/2005 |
| JP | 2005 105915 | 4/2005 |
| JP | 2006 122878 | 5/2006 |
| WO | 2006 051017 | 5/2006 |

* cited by examiner

*Primary Examiner* — Thomas Denion
*Assistant Examiner* — Audrey K Bradley
(74) *Attorney, Agent, or Firm* — Oblon, Spivak, McClelland, Maier & Neustadt, L.L.P.

(57) ABSTRACT

An internal combustion engine wherein when an aqueous urea solution should be fed from an aqueous urea solution feed valve (8), a feed pump (9) is operated forward and aqueous urea solution in an aqueous urea solution tank (4) is fed through an aqueous urea solution feed passage (10) into the aqueous urea solution feed valve (8). When ceasing the feed of aqueous urea solution from the aqueous urea solution feed valve (8), the feed pump (9) is operated in reverse whereby the ammonia gas generated in the aqueous urea solution tank (4) is drawn through a ammonia gas feed pipe (11) into the aqueous urea solution feed passage (10). Next, when the feed pump (9) is operated forward, the ammonia gas drawn into the aqueous urea solution feed path (10) is ejected from the aqueous urea solution feed valve (8).

7 Claims, 3 Drawing Sheets

AQUEOUS UREA SOLUTION FEED DEVICE OF AN INTERNAL COMBUSTION ENGINE

TECHNICAL FIELD

The present invention relates to an aqueous urea solution feed device of an internal combustion engine.

BACKGROUND ART

In an internal combustion engine feeding aqueous urea solution in an engine exhaust passage to reduce the $NO_x$ in the exhaust gas, there is provided an aqueous urea solution tank for storing aqueous urea solution. Ammonia gas vaporized from the aqueous urea solution fills this aqueous urea solution tank, accordingly, removing the lid of the refilling inlet of the aqueous urea solution tank to refill the aqueous urea solution will release ammonia gas into the outside air.

Therefore, to prevent such release of the ammonia gas into the outside air, there is known an aqueous urea solution tank provided with an electric fan for forcibly exhausting the ammonia gas generated in the aqueous urea solution tank to the top of the aqueous urea solution tank, an adsorption apparatus for temporarily adsorbing the ammonia gas exhausted by the electric fan, and an oxidation catalyst for oxidizing the ammonia desorbed from the adsorption apparatus (for example, refer to Japanese Patent Publication (A) No. 2005-105915).

However, in this aqueous urea solution tank, there is the problem of the generated ammonia gas being needlessly consumed.

DISCLOSURE OF THE INVENTION

An object of the present invention is to provide an aqueous urea solution feed device of an internal combustion engine using the ammonia gas generated in an aqueous urea solution tank to reduce $NO_x$.

According to the present invention, there is provided an aqueous urea solution feed device of an internal combustion engine provided with an aqueous urea solution feed valve arranged in an engine exhaust passage upstream of an $NO_x$ selective reducing catalyst, an aqueous urea solution tank, and a feed pump for feeding an aqueous urea solution stored in the aqueous urea solution tank to the aqueous urea solution feed valve, the feed pump being operated forward to feed the aqueous urea solution in the aqueous urea solution tank to the aqueous urea solution feed valve when the aqueous urea solution should be fed from the aqueous urea solution feed valve, wherein an ammonia gas feed pipe for feeding ammonia gas generated in the aqueous urea solution tank is connected to an end of an aqueous urea solution feed passage extending from the feed pump to the aqueous urea solution feed valve, said end being on the aqueous urea solution feed valve side, and the ammonia gas generated in the aqueous urea solution tank is drawn into the aqueous urea solution feed passage via the ammonia gas feed pipe by operating the feed pump in reverse when the supply of the aqueous urea solution from the aqueous urea solution feed valve is stopped, the ammonia gas drawn into the aqueous urea solution feed passage being ejected from the aqueous urea solution feed valve when operating the feed pump forward.

BEST MODE FOR CARRYING OUT THE INVENTION

Figure 1:
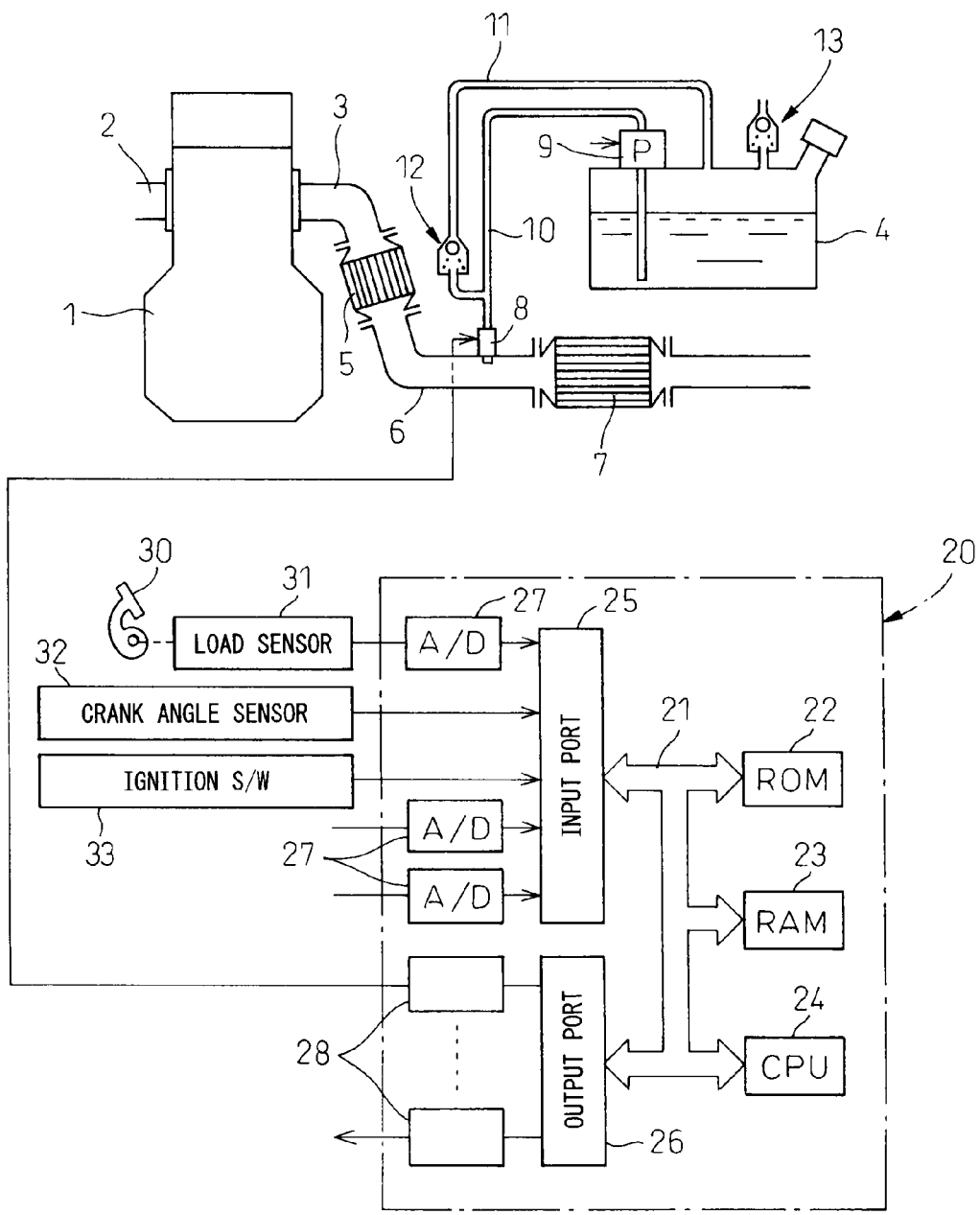
FIG. 1 is an overview of a compression ignition type internal combustion engine.

FIG. 1 shows an overview of a compression ignition type internal combustion engine.

Referring to FIG. 1, 1 indicates an engine body, 2 an intake manifold, 3 an exhaust manifold, and 4 an aqueous urea solution tank. An outlet of the exhaust manifold 3 is coupled to an inlet of an oxidation catalyst 5, while an outlet of the oxidation catalyst 5 is coupled through an exhaust pipe 6 to an inlet of an $NO_x$ selective reducing catalyst 7. An aqueous urea solution feed valve 8 is arranged in the exhaust pipe 6 upstream of the $NO_x$ selective reducing catalyst 7.

On the other hand, a feed pump 9 for feeding the aqueous urea solution stored in the aqueous urea solution tank 4 to the aqueous urea solution feed valve 8 is arranged at the top of the aqueous urea solution tank 4. This feed pump 9 is coupled to the aqueous urea solution feed valve 8 through an aqueous urea solution feed passage 10 extending from the feed pump 9 to the aqueous urea solution feed valve 8. In the embodiment shown in the FIG. 1, this aqueous urea solution feed passage 10 is formed from a duct.

On the other hand, as shown in FIG. 1, an ammonia gas feed pipe 11 for feeding ammonia gas generated in the aqueous urea solution tank 4 is connected to the end of the aqueous urea solution feed passage 10, which is on the aqueous urea solution feed valve 8 side. In the embodiment shown in FIG. 1, this ammonia gas feed pipe 11 is connected to the inside upper space of the aqueous urea solution tank 4. Further, a check valve 12 enabling flow only from the inside of the ammonia gas feed pipe 11 toward the aqueous urea solution feed passage 10 is arranged at the end of the ammonia gas feed pipe 11, which is on the aqueous urea solution feed valve 8 side.

Further, a check valve 13 enabling flow only from the outside toward the aqueous urea solution tank 4 is arranged at the top of the aqueous urea solution tank 4. When the pressure in the aqueous urea solution tank 4 becomes the atmospheric pressure or less, the outside air flows through the check valve 13 into the aqueous urea solution tank 4, whereby the pressure in the aqueous urea solution tank 4 is maintained at substantially the atmospheric pressure or more.

An electronic control unit 20 comprises a digital computer and is provided with a ROM (read only memory) 22, RAM (random access memory) 23, CPU (microprocessor) 24, input port 25, and output port 26 which are connected with each other by a bi-directional bus 21. An accelerator pedal 30 is connected to a load sensor 31 generating an output voltage proportional to the depression amount L of the accelerator pedal 30. The output voltage of the load sensor 31 is input through a corresponding AD converter 27 to the input port 25. Further, a crank angle sensor 32 generating an output pulse every time the crankshaft rotates by for example 15° is connected to the input port 25. Further, an on/off signal from an ignition switch 33 is input to the input port 25. On the other hand, the output port 26 is connected to the aqueous urea solution feed valve 8 and feed pump 20 through corresponding drive circuits 28.

The $NO_x$ selective reducing catalyst 7 is comprised of an ammonia adsorption type Fe zeolite, for example. The aqueous urea solution fed from the aqueous urea solution feed valve 8 is adsorbed on the $NO_x$ selective reducing catalyst 7, and the $NO_x$ contained in the exhaust gas is reduced at the $NO_x$ selective reducing catalyst 7 by the ammonia generated from the adsorbed urea $((NH_2)_2CO+H_2O \to 2NH_3+CO_2)$. The oxidation catalyst 5 carries a precious metal catalyst such as for example platinum. This oxidation catalyst 5 performs an action of oxidizing the HC contained in the exhaust gas. That is, in a type of $NO_x$ selective reducing catalyst 7 adsorbing ammonia, if HC is adsorbed, the adsorbed amount of ammonia decreases, thereby lowering the $NO_x$ purification rate. Accordingly, the embodiment shown in the drawing oxidizes the HC by the oxidation catalyst 5, thereby preventing the $NO_x$ purification rate from dropping.

Now, when an aqueous urea solution should be fed from the aqueous urea solution feed valve 8, the feed pump 9 is operated forward. The aqueous urea solution in the aqueous urea solution tank 4 at this time is fed through the aqueous urea solution feed passage 10 to the aqueous urea solution feed valve 8. At this time, the check valve 12 is closed. If the ammonia adsorption amount of the $NO_x$ selective reducing catalyst 7 reaches saturation, the feed of the aqueous urea solution ceases.

In this regard, the upper space of the aqueous urea solution tank 4 is filled with the ammonia gas generated from the aqueous urea solution. In the present invention, to reduce this ammonia gas, the feed pump 9 is temporarily operated in reverse when the feed of aqueous urea solution from the aqueous urea solution feed valve 8 is stopped. Operating the feed pump 9 in reverse causes the aqueous urea solution that is remaining in the aqueous urea solution feed passage 10 to be drawn back into the aqueous urea solution tank 4. At this time, the check valve 12 opens, and the ammonia gas generated in the aqueous urea solution tank 4 is drawn through the ammonia gas feed pipe 11 into the aqueous urea solution feed passage 10. Accordingly, the aqueous urea solution feed passage 10 becomes filled with ammonia gas.

Next, if the feed pump 9 is operated forward to feed aqueous urea solution from the aqueous urea solution feed valve 8, the ammonia gas drawn in the aqueous urea solution feed passage 10 is first ejected from the aqueous urea solution feed valve 8, whereby aqueous urea solution is then ejected. The ammonia gas generated in the aqueous urea solution tank 4 every time the feed of the aqueous urea solution is restarted in this way is ejected from the aqueous urea solution feed valve 8, whereby the ammonia gas in the aqueous urea solution tank 4 gradually decreases.

Note that, a solenoid valve may be used in place of the check valve 12. In this case, when the feed pump 9 is operated in reverse, the solenoid valve is opened. That is, the ammonia gas feed pipe 11 has arranged in it a valve that opens when the feed pump 9 is operated in reverse. As this valve, a check valve, solenoid valve, or various other types of valves may be used.

Further, in the embodiment shown in FIG. 1, even when the engine is halted, the feed pump 9 can be operated in reverse. Accordingly, when the aqueous urea solution feed valve 8 is first opened at the time of engine startup, ammonia gas is ejected from the aqueous urea solution feed valve 8. When the temperature of the $NO_x$ selective reducing catalyst 7 is low at the time of engine startup, it is difficult for ammonia to be created even when feeding aqueous urea solution from the aqueous urea solution feed valve 8, therefore only a low $NO_x$ purification rate can be achieved. However, as in the above, if ammonia gas is ejected from the aqueous urea solution feed valve 8 at the time of engine startup, this ammonia gas causes the $NO_x$ in the exhaust gas to be immediately reduced, whereby a high $NO_x$ purification rate can be achieved from the time of engine startup.

Figure 2:
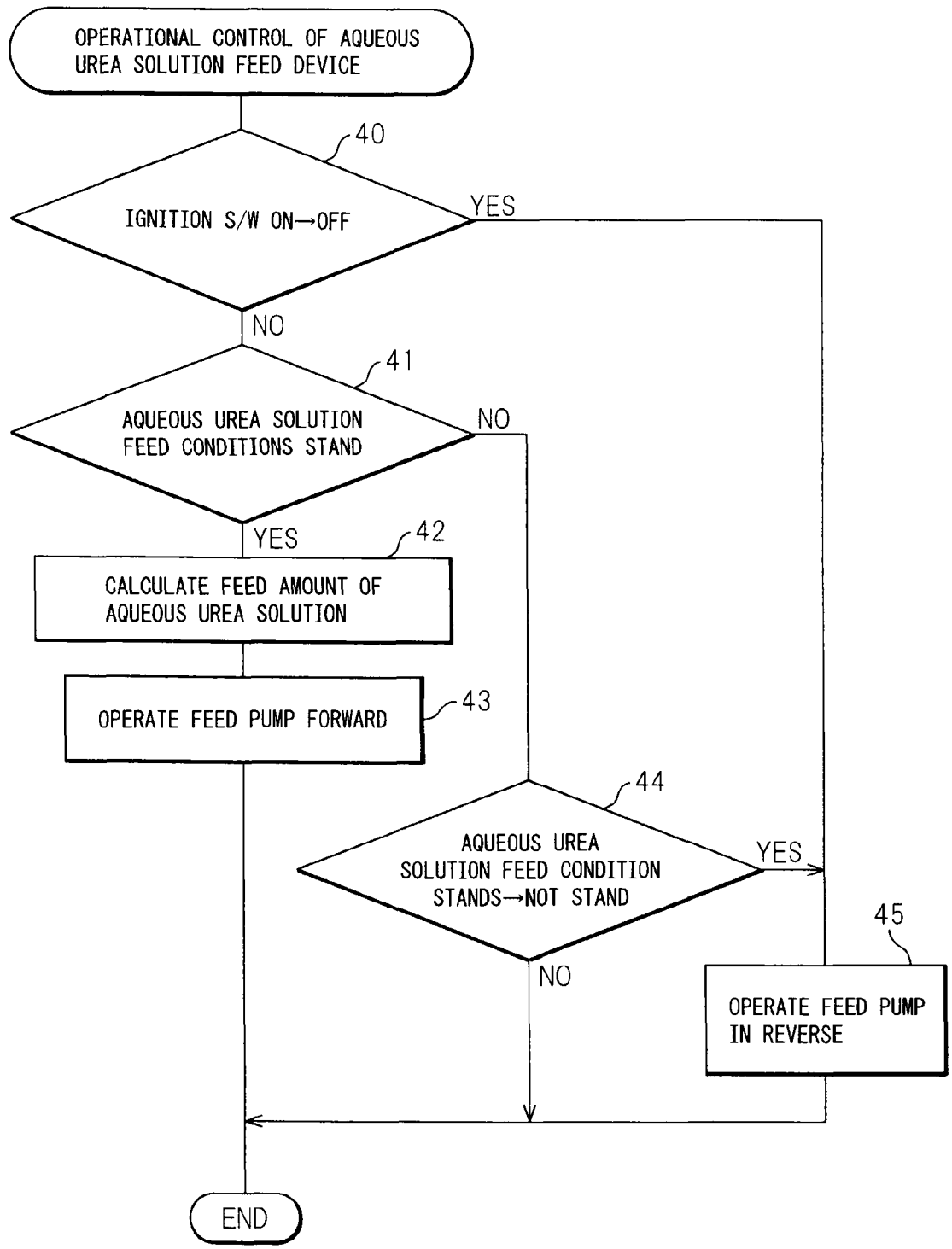
FIG. 2 is a flow chart for operational control of an aqueous urea solution feed device.

FIG. 2 shows the operational control routine of the aqueous urea solution feed device. This routine is executed by interruption every predetermined period.

Referring to FIG. 2, first, at step 40, it is judged if the ignition switch 33 is switched from on to off. When the ignition switch 33 is on, the routine proceeds to step 41, where it is judged if the state is one in which aqueous urea solution should be fed, that is, if the aqueous urea solution feed condition stands. When the aqueous urea solution feed condition stands, the routine proceeds to step 42, where the feed amount of aqueous urea solution is calculated, then at step 43, the feed pump 9 is operated forward to feed the aqueous urea solution.

On the other hand, when it is judged at step 41 that the aqueous urea solution feed condition does not stand, for example, when the ammonia adsorption amount of the $NO_x$ selective reducing catalyst 7 reaches saturation, the routine proceeds to step 44, where it is judged if the aqueous urea solution feed condition has switched from standing to not standing. When switched from standing to not standing, the routine proceeds to step 45, where the feed pump 9 is temporarily operated in reverse. On the other hand, when it is judged at step 40 that the ignition switch 33 was switched from on to off, that is, when the engine is halted, the routine proceeds to step 45, where the feed pump 9 is temporarily operated in reverse.

Figure 3:
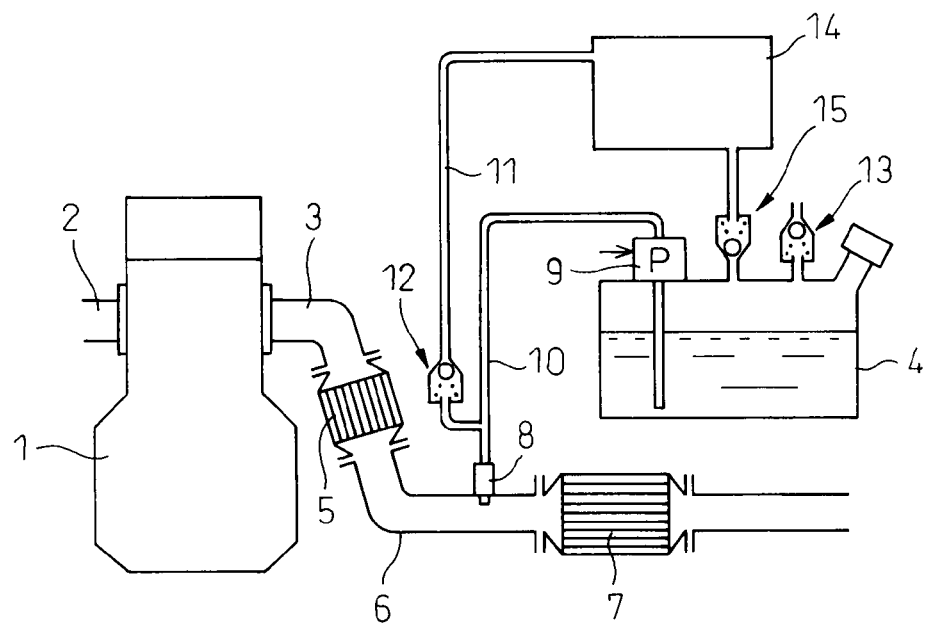
FIG. 3 is an overview showing another embodiment of a compression ignition type internal combustion engine.

FIG. 3 shows another embodiment. In this embodiment, an ammonia gas storage tank 14 for storing the ammonia gas generated in the aqueous urea solution tank 4 is provided. The upper space of the aqueous urea solution tank 4 is coupled through a check valve 15 enabling flow only from the inside of the aqueous urea solution tank 4 toward the ammonia gas storage tank 14 with the ammonia gas storage tank 14. Accordingly, the inside of the ammonia gas storage tank 14 is filled with the ammonia gas generated in the aqueous urea solution tank 4. In this embodiment, as shown in FIG. 3, the ammonia feed pipe 11 is connected to the ammonia gas storage tank 14.

Figure 4:
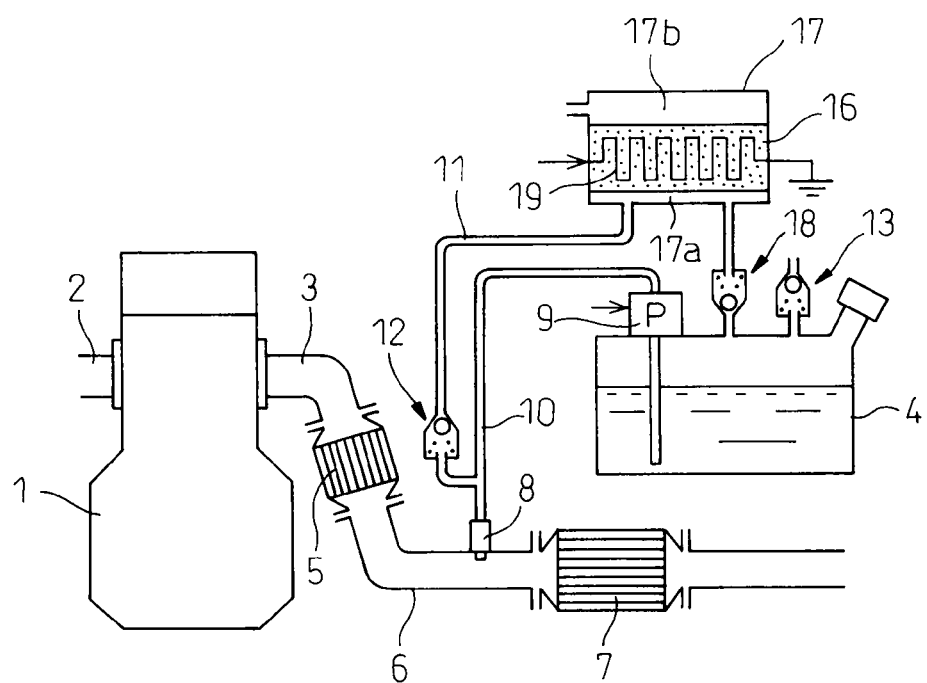
FIG. 4 is an overview showing still another embodiment of a compression ignition type internal combustion engine.

FIG. 4 shows still another embodiment. In this embodiment, there is provided an ammonia adsorption device 17 having a built-in ammonia adsorbent 16 for adsorbing the ammonia gas generated in the aqueous urea solution tank 4. The ammonia gas feed pipe 11 is connected to the ammonia adsorption device 17. Explaining this in more detail, in this embodiment, inside the ammonia adsorption device 17 at both sides of the ammonia adsorbent 16 comprised of for example zeolite, there are formed an ammonia gas chamber 17a and an atmospheric chamber 17b. The ammonia gas feed pipe 11 is connected to the ammonia gas chamber 17a.

On the other hand, the upper space of the aqueous urea solution tank 4 is coupled through a check valve 18 enabling flow only from the inside of the aqueous urea solution tank 4 toward the aqueous urea solution feed passage 17 with the ammonia gas chamber 17a. Accordingly, the ammonia gas generated in the aqueous urea solution tank 4 flows into the ammonia gas chamber 17a, and the ammonia in the ammonia gas is adsorbed on the ammonia adsorbent 16. Note that a heater 19 is embedded in this ammonia adsorbent 16.

In this embodiment, if the feed pump 9 is operated in reverse, the air in the atmospheric chamber 17b passes through the ammonia adsorbent 16 and is drawn into the ammonia gas chamber 17a. At this time, the ammonia is desorbed from the ammonia adsorbent 16, then the ammonia desorbed from the ammonia adsorbent 16 is drawn through the ammonia gas feed pipe 11 into the aqueous urea solution feed passage 10. In this embodiment, to accelerate the desorption action of the ammonia from the ammonia adsorbent 16, the ammonia adsorbent 16 is heated by the heater 19.

LIST OF REFERENCE NUMERALS

3 . . . exhaust manifold
4 . . . aqueous urea solution tank
5 . . . oxidation catalyst
7 . . . $NO_x$ selective reducing catalyst
8 . . . aqueous urea solution feed valve
9 . . . feed pump
10 . . . aqueous urea solution feed passage
11 . . . ammonia gas feed pipe
12,13 . . . check valve

The invention claimed is:

1. An aqueous urea solution feed device of an internal combustion engine provided with an aqueous urea solution feed valve arranged in an engine exhaust passage upstream of an $NO_x$ selective reducing catalyst, an aqueous urea solution tank, and a feed pump for feeding an aqueous urea solution stored in the aqueous urea solution tank to the aqueous urea solution feed valve, the feed pump being operated forward to feed the aqueous urea solution in the aqueous urea solution tank to the aqueous urea solution feed valve when the aqueous urea solution is in a condition to be fed from the aqueous urea solution feed valve, wherein an ammonia gas feed pipe for feeding ammonia gas generated in the aqueous urea solution tank is connected to an end of an aqueous urea solution feed passage extending from the feed pump to the aqueous urea solution feed valve, said end being on the aqueous urea solution feed valve side, and the ammonia gas generated in the aqueous urea solution tank is drawn into the aqueous urea solution feed passage via the ammonia gas feed pipe by operating the feed pump in reverse when the supply of the aqueous urea solution from the aqueous urea solution feed valve is stopped, the ammonia gas drawn into the aqueous urea solution feed passage being ejected from the aqueous urea solution feed valve when operating the feed pump forward.

2. The aqueous urea solution feed device of an internal combustion engine as claimed in claim 1, wherein the ammonia gas feed pipe is connected to an upper space inside the aqueous urea solution tank.

3. The aqueous urea solution feed device of an internal combustion engine as claimed in claim 1, wherein an ammonia gas storage tank for storing ammonia gas generated in the aqueous urea solution tank is provided, and the ammonia gas feed pipe is connected to the ammonia gas storage tank.

4. The aqueous urea solution feed device of an internal combustion engine as claimed in claim 1, wherein a valve opening when the feed pump is operated in reverse is arranged in the ammonia gas feed pipe.

5. The aqueous urea solution feed device of an internal combustion engine as claimed in claim 1, wherein at engine startup, when the aqueous urea solution feed valve is first opened, ammonia gas is ejected from the aqueous urea solution feed valve.

6. The aqueous urea solution feed device of an internal combustion engine as claimed in claim 1, wherein an ammonia adsorption device with a built-in ammonia adsorbent for adsorbing ammonia gas generated in the aqueous urea solution tank is provided, and the ammonia gas feed pipe is connected to the ammonia adsorption device, the ammonia desorbed from the ammonia adsorbent when the feed pump is operated in reverse being fed through the ammonia gas feed pipe into the aqueous urea solution feed passage.

7. The aqueous urea solution feed device of an internal combustion engine as claimed in claim 6, wherein a heater for heating the ammonia adsorbent is provided, and the ammonia adsorbent is heated by the heater when ammonia is in a condition to be desorbed from the ammonia adsorbent.

* * * * *